US007519014B2

(12) United States Patent
Allen et al.

(10) Patent No.: US 7,519,014 B2
(45) Date of Patent: Apr. 14, 2009

(54) MULTI-NETWORK AIRCRAFT COMMUNICATION SYSTEMS AND METHODS

(75) Inventors: David L. Allen, Kent, WA (US); Mary Ann T. Nakasone, Bothell, WA (US); Edward J. Porisch, Everett, WA (US); Kent Loving, Snohomish, WA (US); Bruce K. Pollock, Seattle, WA (US)

(73) Assignee: The Boeing Company, Chicago, IL (US)

( * ) Notice: Subject to any disclaimer, the term of this patent is extended or adjusted under 35 U.S.C. 154(b) by 287 days.

(21) Appl. No.: 11/303,647

(22) Filed: Dec. 16, 2005

(65) Prior Publication Data

US 2007/0140152 A1    Jun. 21, 2007

(51) Int. Cl.
*H04B 7/00* (2006.01)
*H04J 3/22* (2006.01)
(52) U.S. Cl. ...................... 370/310; 370/465
(58) Field of Classification Search .......... 370/310, 370/310.1, 310.2, 238, 351, 229, 241–252, 370/328–329, 331, 338, 400–406; 455/422–426, 455/561, 556, 67.1, 67.3
See application file for complete search history.

(56) References Cited

U.S. PATENT DOCUMENTS 6,353,779 B1   3/2002   Simon et al.
6,961,312 B2 * 11/2005 Kubler et al. ............... 370/238
7,274,676 B2 *  9/2007 Cardei et al. ............... 370/328
2005/0190784 A1 *  9/2005 Stine ......................... 370/445
2006/0080451 A1 *  4/2006 Eckert ........................ 709/230

FOREIGN PATENT DOCUMENTS

WO    WO0186836 A2    11/2001

OTHER PUBLICATIONS

Allen, David, "EFB Electronic Flight Bag", AERO, Jul. 2003 Third Quarter, pp. 16-27.
Grappel, "Open System Protocols for Aviation Data Link Applications", Digital Avionics Systems Conferences, 2000, Proceedings DASC 19th Oct. 7-13, 2000, IEEE, pp. 7.E.3-1-7.E.3-6.
European Search Report for Applicaton No. 060770626.8 mailed on Apr. 17, 2008, 7 pgs.

\* cited by examiner

*Primary Examiner*—Melody Mehrpour (57) ABSTRACT

Systems and methods for multi-network aircraft communications are disclosed. In one embodiment, a communication system includes a communications module executing in an onboard computer in an aircraft. Applications executing on the onboard computer generate messages, which the communications module transmits over one of a plurality of broadcast networks including ACARS and IP based systems. The communications module selects which of the broadcast networks will carry a message according to a configuration file associated with the generating application. Messages may have a priority associated therewith, with low priority messages being stored and transmitted upon availability if a preferred broadcast network is unavailable.

23 Claims, 8 Drawing Sheets

MULTI-NETWORK AIRCRAFT COMMUNICATION SYSTEMS AND METHODS

FIELD OF THE INVENTION

This invention relates generally to wireless communication and, more specifically, to legacy aircraft radio communication systems.

BACKGROUND OF THE INVENTION

Most aircraft are equipped to communicate over a network of ground-based transmission stations and satellites known as the Aircraft Communication Addressing and Reporting System (ACARS). Communications on ACARS follow protocols established by the ARINC organization. The protocols require rigid formatting and only allow for limited character based data transfer. Messages are typically transmitted in a burst transmission following a complex handshaking procedure establishing a connection between the aircraft and a ground radio transmission station or satellite and allocating a segment of time to the aircraft.

Recently, satellite and ground based networks using the Internet Protocol (IP) have become available for use in aircraft communications. IP based communication systems segment messages and package the segments into packets containing addressing and verification data. Acknowledgement and retransmission procedures ensure that messages are received. Messages transmitted under IP protocols are transmitted over low-level data link protocols such as proprietary satellite communication protocols or commonly used wireless protocols such as 802.11b, 802.11g, generalized packet radio service (GPRS), Bluetooth, and the like. Shorter range data link protocols such as 802.11b, 802.11g, and Bluetooth are typically only available to an aircraft proximate a ground-based transmission station located at an airport. Satellite IP-based communication systems are also not always available to aircraft during flight.

In prior systems, airborne applications supported only one communication protocol, typically either IP or ACARS. Given this communication protocol dependency, applications were unable to take advantage of both the broad coverage provided by ACARS communication and the reliable and high speed data transfer provided by IP-based communication. Prior ground-based systems likewise require extensive modification to receive the different protocols.

SUMMARY OF THE INVENTION

The present invention is directed to methods and systems that provide applications executing on aircraft transparent access to multiple communication networks that each use a different communication protocol, such as, ACARS, IP, and the Aeronautical Communication Network (ATN) communication protocols. In one embodiment, a plurality of transmission networks such as the ACARS network, satellite IP networks, and ground based IP networks are configured to send and receive data according to their respective protocols. A ground-based computer is programmed to communicate over the plurality of transmission networks with an onboard computer mounted in an aircraft. The ground-based computer and onboard computer each host a plurality of applications generating messages for communication over the plurality of networks. Communications modules executing on the ground-based and onboard computers receive the messages and determine over which of the plurality of networks to transmit the message. The communications module references a configuration file associated with the application generating the message to determine which network will carry the message. The communications module transmits the message over the most preferred network available for transmission. The communications module of the onboard computer formats messages for the communications channel selected. For ACARS transmission, the communications module translates binary information into allowable ACARS characters for transmission. The communications module hosted on the ground-based computer translates messages transmitted over ACARS into their original binary format.

In further embodiments, applications or messages from applications may have a priority assigned thereto. Messages having priority below a threshold are stored if a preferred transmission network listed in a configuration file associated with the message is not available. The stored message is transmitted upon determining that the preferred transmission network has become available.

BRIEF DESCRIPTION OF THE DRAWINGS

Embodiments of the present invention are described in detail below with reference to the following drawings.

DETAILED DESCRIPTION

The present invention relates to systems and methods for multi-network aircraft communication. Many specific details of certain embodiments of the invention are set forth in the following description and in FIGS. 1-8 to provide a thorough understanding of such embodiments. The present invention, however, may have additional embodiments, or may be practiced without one or more of the details described below.

Figure 1:
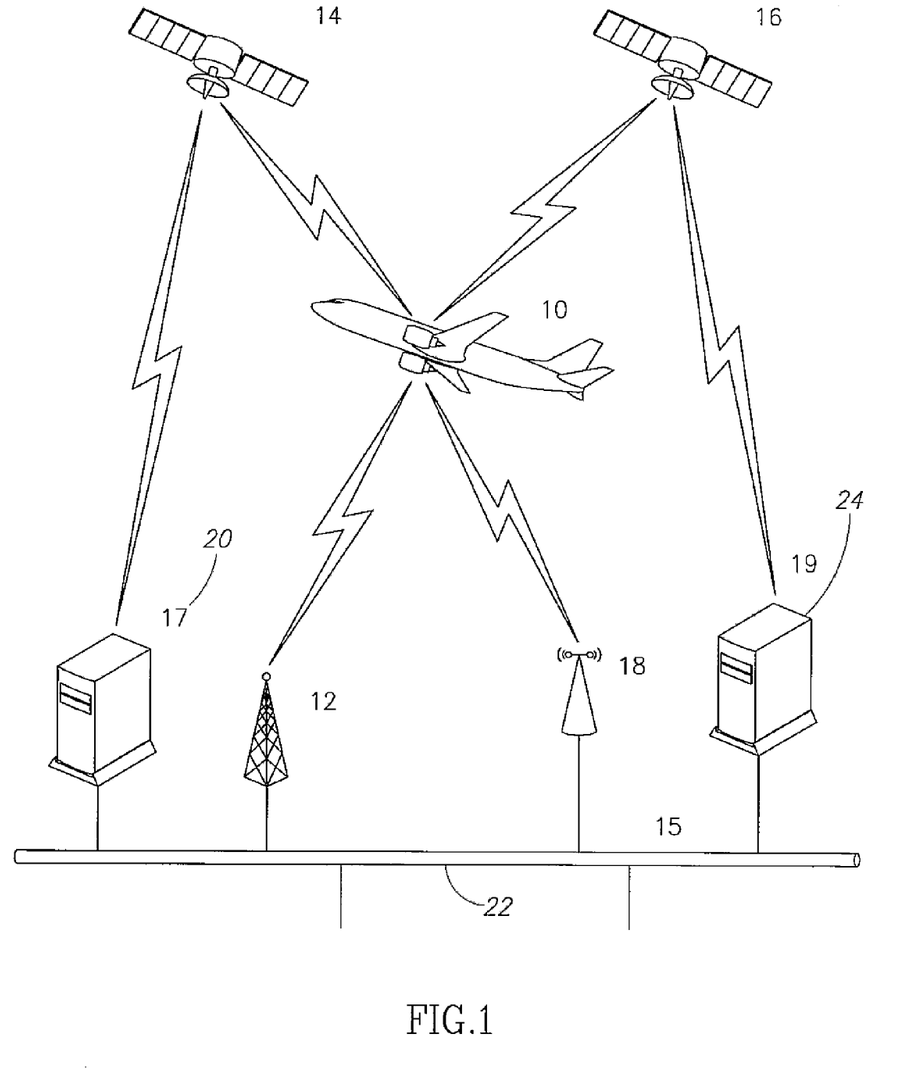
FIG. 1 is a schematic diagram of elements of an aircraft communication system.

Referring to FIG. 1, an aircraft 10 communicates with receiving devices forming the Aircraft Communications, Addressing, and Reporting System (ACARS), such as ground-based transmission stations 12 and satellites 14. Communications on the ACARS network may follow protocols established by the ARINC organization and are processed by the ACARS messaging system (provided by a vendor) 20. In some embodiments, the protocols may require rigid formatting and only allow for character based data transfer. Messages may be transmitted in a burst transmission following a complex handshaking procedure establishing a connection between the aircraft and a receiving device and allocating a segment of time for the aircraft 10 on one of the receiving devices.

The aircraft 10 further communicates with satellites 16 and ground-based transmission stations 18 according to the Internet Protocol (IP). Messages transmitted under IP protocols are transmitted over low-level data link protocols such as proprietary satellite communication protocols or commonly used wireless protocols such as 802.11b, 802.11g, generalized packet radio service (GPRS), Bluetooth, and the like. Shorter range data link protocols such as 802.11b, 802.11g, and Bluetooth are typically only available to an aircraft proximate a ground-based transmission station 18 located at an airport.

Messages transmitted to the ACARS transmission stations 12 and satellites 14 may be processed by an ACARS messaging system 20, which may be provided by an entity distinct from the owner of the aircraft 10. The ACARS messaging system 20 receives messages from the satellites 14 and transmission stations 12 and transmits the messages over the Internet 22 to a ground-based computer 24. The ground-based computer 24 likewise transmits messages over the Internet 22 to the messaging system 20 for transmittal to the aircraft 10 by means of the satellites 14 and ground-based transmission stations 12. Messages transmitted from the aircraft 10 over IP ground-based transmission stations 18 may likewise be transmitted over the Internet 22, or other network, to the ground-based computer 24. Messages transmitted from the ground-based computer 24 may be transmitted over the Internet 22 to the ground-based transmission stations 18 or transmitted to the satellites 16. In some embodiments, an intermediate computing system receives messages to be transmitted over the ground-based transmission stations 18 and satellites 16 and forwards the messages over the ground-based transmission stations 18 and satellites 16.

Figure 2:
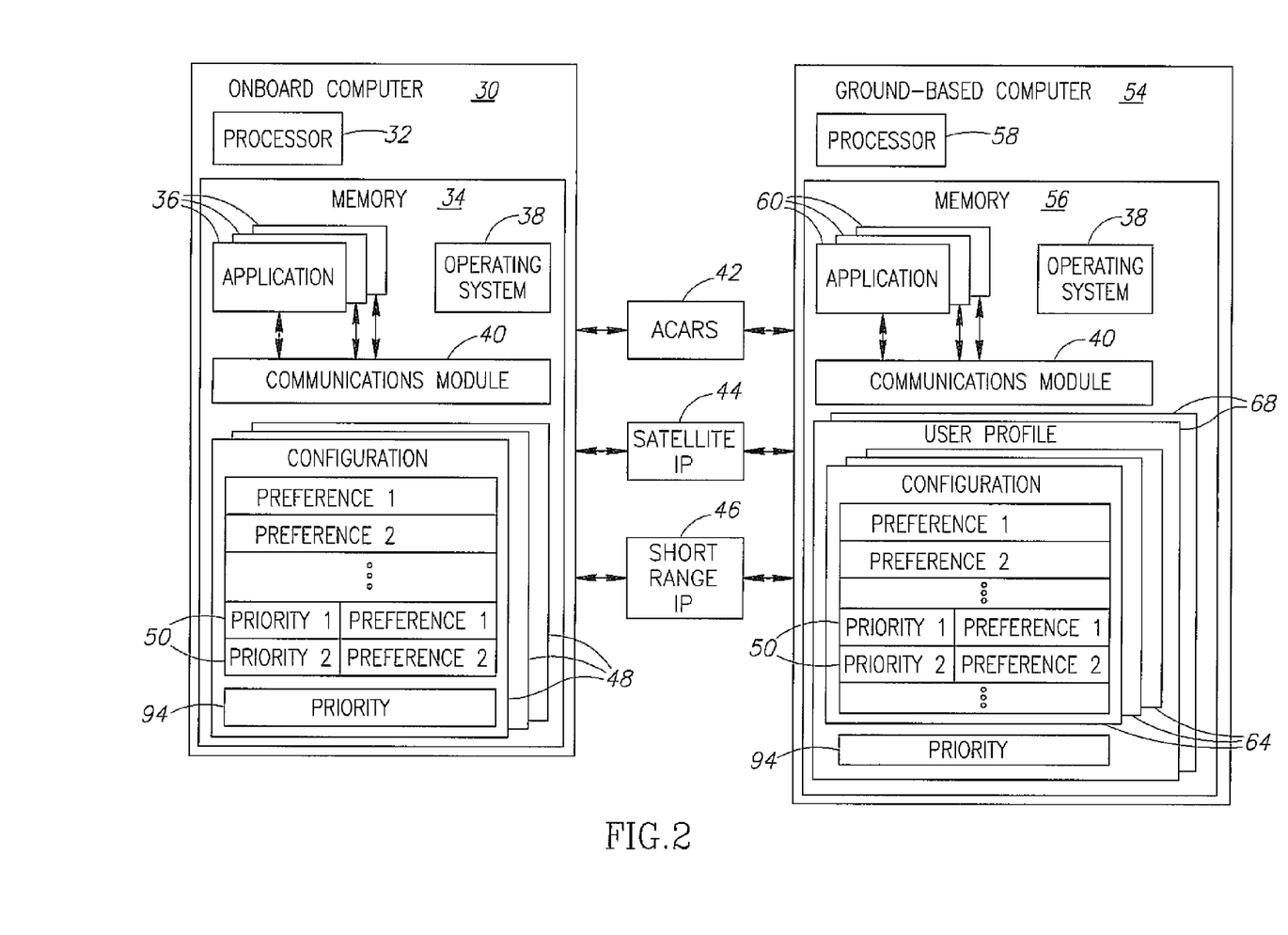
FIG. 2 is a schematic block diagram of executable and operational data structures for handling aircraft communications, in accordance with an embodiment of the present invention.

Referring to FIG. 2, one or more aircraft 10 may house an onboard computer 30 having a processor 32 for executing executable data and processing operational data and a memory 34 for storing executable and operational data. The memory 34 stores a plurality of applications 36, an operating system 38, and a communications module 40. The applications 36 may be operable to facilitate piloting of the aircraft 10. Typical applications include maintenance scheduling and reporting programs, airport navigation systems, and the like. The operating system 38 provides' access to resources available to the computer 30, such as a display, hard drive, network adapter, and the like.

The communications module 40 facilitates access by the applications 36 to wireless ACARS and IP communications. The communications module 40 receives message data and addressing data from the applications 36 and transmits the data to a specified destination over communication systems including the ACARS system 42, a satellite IP system 44, and a short range IP system 46. The communication module 40 also receives messages by means of the communication systems 42, 44, 46 and forwards the messages to the applications 36.

The communication module 40 may select which communication system 42, 44, 46 will be used according to application specific configurations 48 stored in the memory 34. The communications module 40 typically determines which of the communication systems 42, 44, 46 is available for data transmission and transmits data over the communication system 42, 44, 46 and has the highest preference as listed in the configurations 48.

The configurations 48 list preferences regarding which communication system should be used. In some embodiments, the configurations 48 map a priority 50 associated with a particular message to a particular communication system 42, 44, 46 or to a particular ordered list of communication systems 42, 44, 46. In further embodiments, the communication module 40 selects a communication system 42, 44, 46 according to a general configuration 52 stored in the memory 34. The communications module 40 may select one of the communication systems 42, 44, 46 according to the general configuration 52 in the absence of a preference in the application specific configuration 48.

One or more ground-based computers 24 communicates with the onboard computers 30 by means of communication systems 42, 44, 46. The ground-based computer has a memory 56 and processor 58 and stores a communication module 40 and applications 60 programmed to communicate with the applications 36 stored in the onboard computer 30. The ground-based computer memory 56 likewise stores a plurality of application configurations 64 indicating application specific preferences regarding which communication system 42, 44, 46 to use. The ground-based computer memory 56 may also store a global configuration 66 regarding which communication system 42, 44, 46 will be used in the absence of a preempting application preference stored in the application configurations 64. Application configurations 64 may be identified with a particular user profile 68, such as an identifier unique to an airline using the ground-based communication module 40. For example, a plurality of user identifiers 68 and associated application configurations may be associated with each airline accessing the functionality of the ground based configuration module 40.

FIG. 2 illustrates a single airborne computer 30 and ground based computer 24. However, embodiments having multiple airborne computers and ground based computers 24 are contemplated. Furthermore, references to modules indicates a functionality which may be embodied as an independent computer executable program or part of a larger program. A single module may be represented by a computer executable program executing on one computer or across multiple computers.

Figure 3:
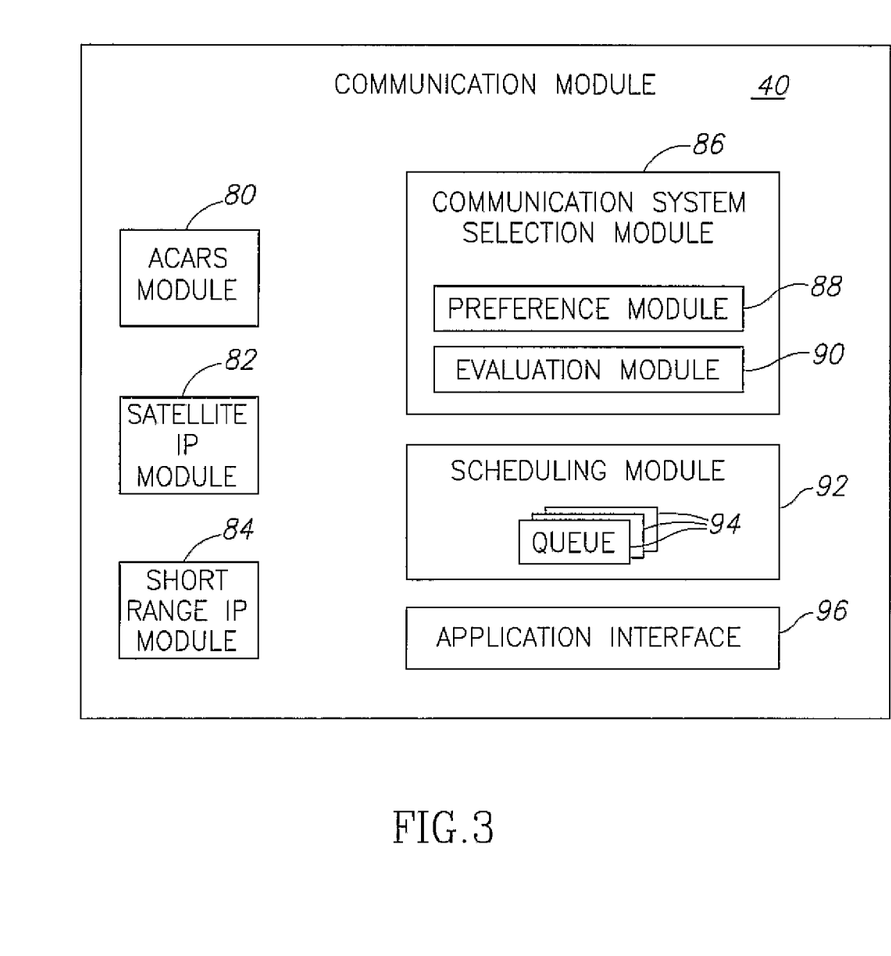
FIG. 3 is a schematic block diagram of a communications module suitable for handling aircraft communications, in accordance with an embodiment of the present invention.

Referring to FIG. 3, the communication module 40 may include an ACARS module 80, satellite IP module 82, and a short range IP module 84. The modules 80, 82, 84 format data according to protocols used for the different communication systems 42, 44, 46. The modules 80, 82, 84 further handle handshaking, verification, error correction, and other connection management functions necessary to communicate by means of their corresponding communication system 42, 44, 46. The modules 80, 82, 84 also receive messages by means of their corresponding communication systems 42, 44, 46 and forward the content of the messages to the applications 36, 60.

The ACARS module 80 may further be programmed to send and receive confirmation that a message has been received by an application 36, 60. A typical ACARS system 42 provides an acknowledgment that a message has been received at a transmission station 12 or satellite 14. However, typical ACARS systems do not provide acknowledgment that a message was successfully forwarded to an intended recipient of the message. Accordingly, the ACARS module 80 is programmed to send confirmation upon receiving a message. The ACARS module 80 is further programmed to receive a confirmation from a remote ACARS module 80 after sending a message and to retransmit the message or provide an error message to the applications 36, 60 if confirmation is not received. The ACARS module 80 translates data, such as binary data, into characters transmittable over the ACARS system 42. For example, in one embodiment, the ACARS module 80 translates binary data into its hexadecimal equivalent for transmission over the ACARS system 42.

The communication module 40 further includes a communication system selection module 86. The communication system selection module 86 includes a preference module 88 programmed to read the application configurations 48, 64 and determine a communication system preference for each message or series of messages. An application 36, 60 generating a message may indicate to the communication module 40 that the message has a particular priority. The preference module 88 may choose which communication system 42, 44, 46 to use according to this priority in addition to the configurations 48, 64. A message having low priority may be sent by means of a communication system 42, 44, 46 lower on a preference list notwithstanding availability of a communication system 42, 44, 46 higher on the list. In some embodiments, the configurations 48, 64 map priority levels to a communication system 42, 44, 46 or to a priority specific preference list. Accordingly, the preference module 88 will compare the priority of a message to such a configuration 48, 64 to determine which communication system 42, 44, 46 will be used.

The communication system selection module 86 may further include a communication system evaluation module 90. The communication system evaluation module 90 determines which of the communications systems 42, 44, 46 is available for data communication. The communication system evaluation module 90 typically tests the communication systems 42, 44, 46 according to their place in a preference list, beginning at the highest preference and moving toward the lowest until an available communication system 42, 44, 46 is found.

In some embodiments, the configuration 48, 64 of an application 36, 60 indicates to a scheduling module 92 that where a specific communication system 42, 44, 46 is not available, messages transmitted by the application 36, 60 are to be stored until the communication system 42, 44, 46 becomes available. In other embodiments, the configuration 48, 64 instructs the scheduling module 92 to examine the priority of a message and store the message until a specific communication system 42, 44, 46 becomes available if the priority is below a certain level and the specific communication system 42, 44, 46 is not available.

The scheduling module 92 may also manage instances in which more than one application 36, 60 is attempting to communicate over the same communication system 42, 44, 46. The scheduling module 92 may evaluate a priority for the application 36, 60 generating a message to determine which message will be transmitted first. For example, the configuration 48 for an application 36, 60 may store a priority 94 assigned to the application by a user. The scheduling module 92 will then refer to the priority 94 when handling messages from an application 36, 60 such that the message from the application having the highest priority 94 is transmitted first. In some embodiments, the applications 36, 60 assign a priority to a particular message. Accordingly, the scheduling module 92 may transmit messages having the highest application-assigned priority first. In some embodiments, the scheduling module 90 orders transmission of messages according to both the application-assigned priority and the application specific priority 94, giving them equal or differing weight. Messages awaiting transmittal ordered as described above may be stored in queues 96 corresponding to the communication systems 42, 44, 46.

The scheduling module 92 may be further programmed to monitor availability of the communication systems 42, 44, 46. If a communication system 42, 44, 46 becomes available or unavailable, the scheduling module 92 rearranges messages stored in the queues such that the messages are moved to the queue 96 for the highest preferred, available communication system 42, 44, 46. For example, a message stored in a queue 96 awaiting transmittal over the ACARS system 42 may be moved to the queue 96 corresponding to the satellite IP system 44 upon detection that the satellite IP system 44 is available provided the satellite IP system 44 has a higher preference than the ACARS system 42 according to preferences associated with the message.

The communication module 40 further includes an application interface 98 enabling the applications 36, 60 to send and receive messages from the communication module 40. The application interface 98 may be embodied as a plurality of functions that are called by the applications 36, 60.

Figure 4:
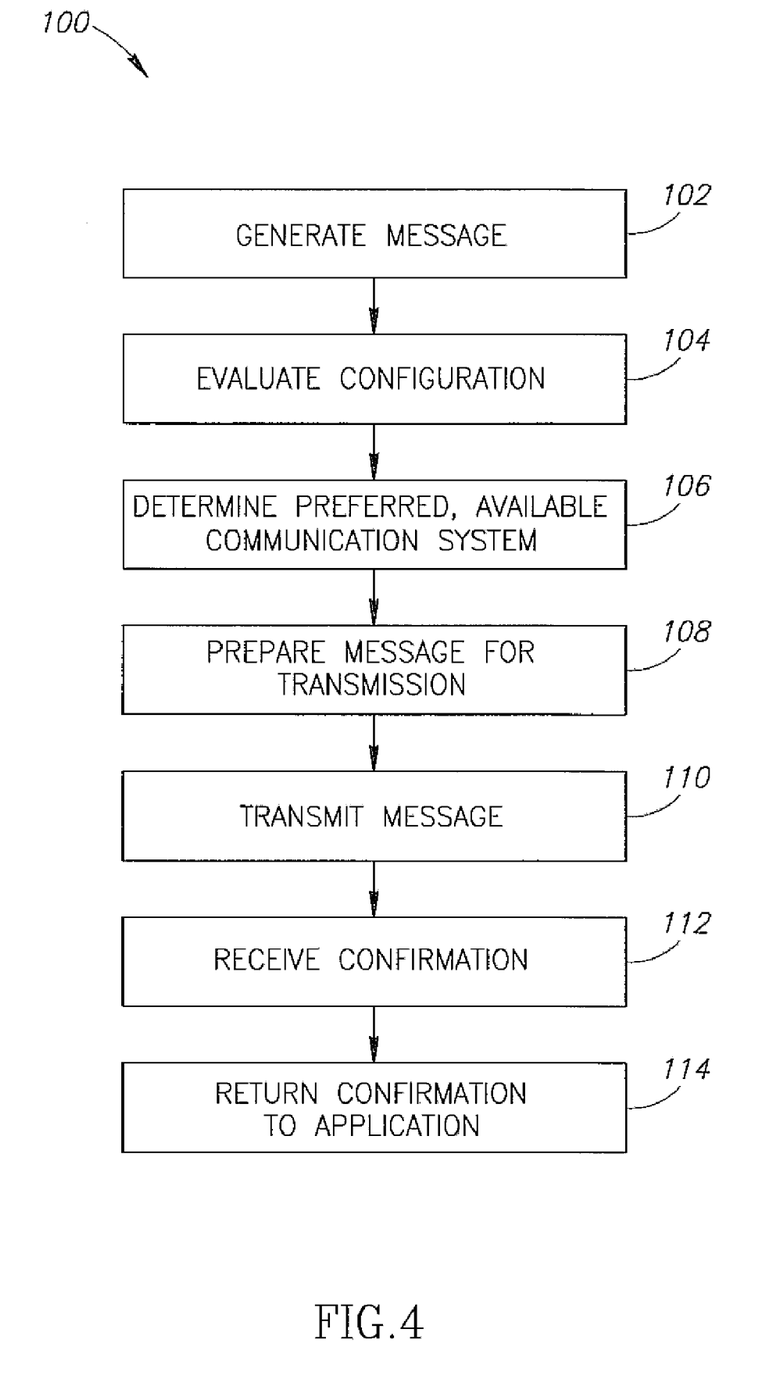
FIG. 4 is a process flow diagram of a method for handling aircraft communications, in accordance with an embodiment of the present invention.

FIG. 4 illustrates a method 100 for handling communication with an aircraft 10 in accordance with an embodiment of the invention. At block 102 the application 36, 60 generates a message to be transmitted to an onboard computer 30 or ground-based computer 24. At block 104, configurations are evaluated. Evaluating configurations may include determining an order of preference of communication systems 42, 44, 46 for a particular message based on the application specific configurations 48, 64, general configuration 52, or both. The configurations 48, 64, 52 may list a preferred communication system 42, 44, 46 for a priority associated with a message. Accordingly, block 104 may include determining the priority of the message and the order of preference of communication systems 42, 44, 46 for that preference.

At block 106, the communications module 40 determines the highest preference communications systems 42, 44, 46 that is available for data transfer. Block 106 may include testing for availability the highest preference communication system 42, 44, 46 determined at block 104. If it is not available, then the communications module 40 tests availability of the next highest preference communication system 42, 44, 46, and so on, until an available communication system 42, 44, 46 is found or all of the preferred communication systems 42, 44, 46 are tested.

At block 108, the communications module 40 prepares the message for transmission on the communication system 42, 44, 46 determined at blocks 104 and 106. At block 110 the message is transmitted according to the handshaking, formatting, verification, and other procedures constituting the protocol for transferring data on the selected communication system 42, 44, 46. At block 112 confirmation of the transfer is received from the destination, such as an onboard computer 30 or ground-based computer system 24, and at block 114, the confirmation is returned to the application 36, 60.

Figure 5:
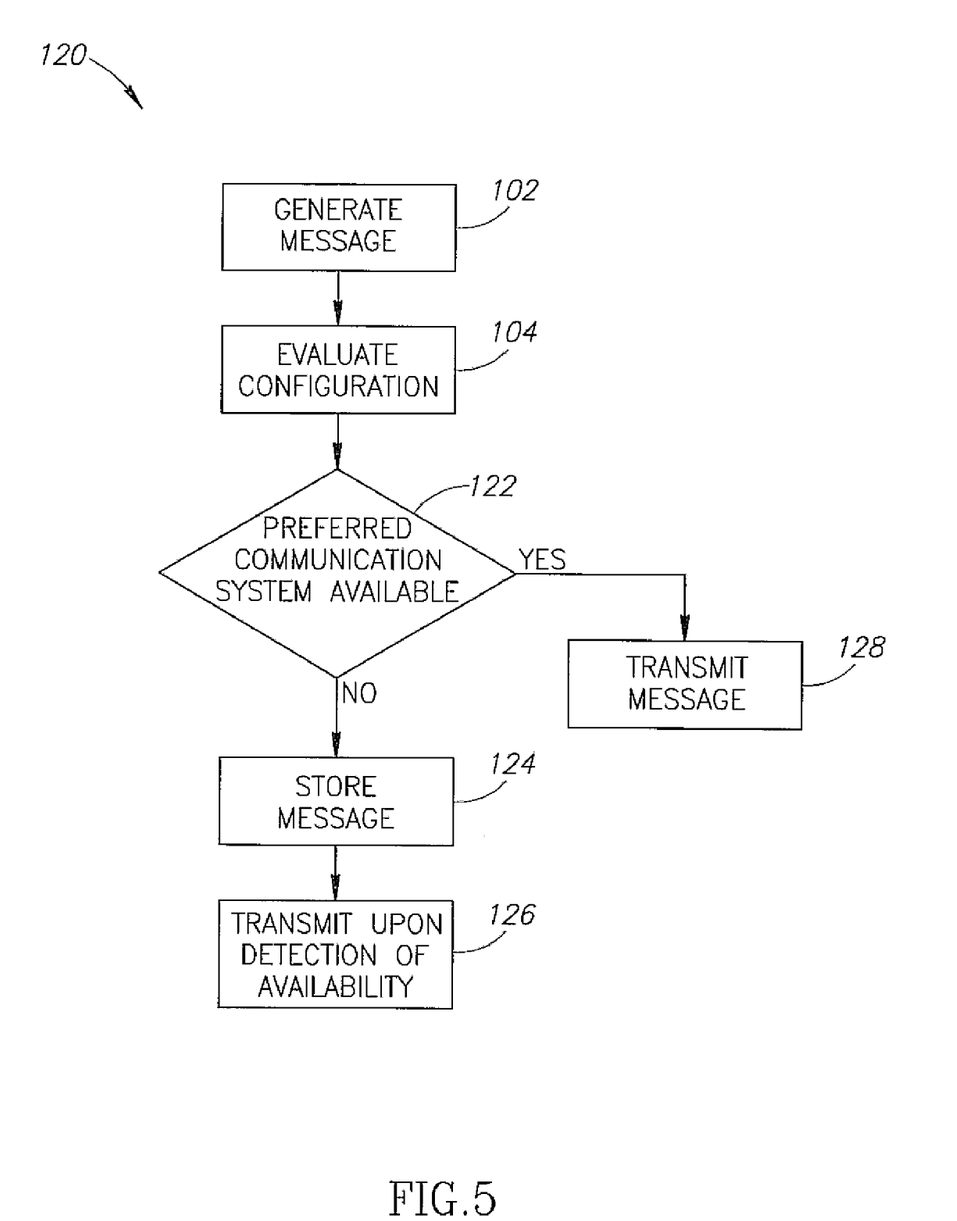
FIG. 5 is a process flow diagram of an alternative method for handling aircraft communications, in accordance with an embodiment of the present invention.

FIG. 5 illustrates an alternative method 120 for handling communication with an aircraft 10. At block 122, the availability of the preferred communication system 42, 44, 46 determined at block 104 is evaluated. If it is not available, the message to be sent is stored at block 124. At block 126, the message is sent upon detecting availability of the preferred communication system 42, 44, 46. If the preferred communication system 42, 44, 46 is found to be available at block 122, the message is transmitted at block 128. Transmitting the message at blocks 126 and 128 may include executing the steps listed in blocks 108, 110, 112, 114 of FIG. 4. Availability as detected at blocks 122 and 126 is typically the result of the aircraft 10 arriving at a point proximate a transmission station 18 located at an airport.

Figure 6:
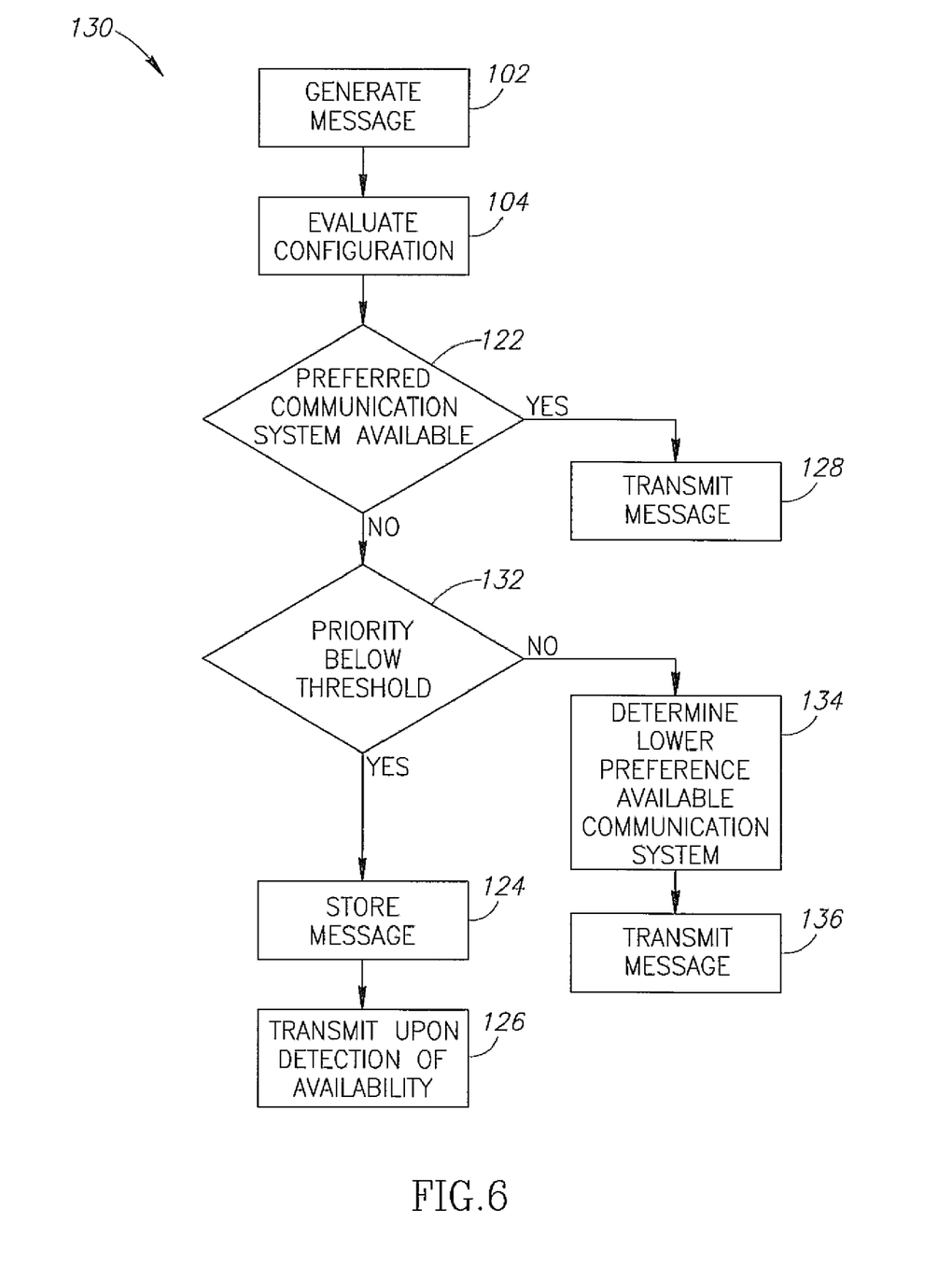
FIG. 6 is a process flow diagram of yet another alternative method for handling aircraft communications, in accordance with an embodiment of the present invention.

FIG. 6 illustrates another alternative method 130 for handling communication with an aircraft 10. At block 132, the communications module 40 evaluates whether the priority of a message is below a threshold. If not, the method 130 identifies an available lower preference communication system 42, 44, 46 at block 134 and transmits the message at block 136 according to the steps recited in blocks 108, 110, 112 and 114 of the method 100. If the priority is below the threshold, then the message is stored at block 124 and sent at block 126 upon detecting availability of the preferred communication system 42, 44, 46.

Figure 7:
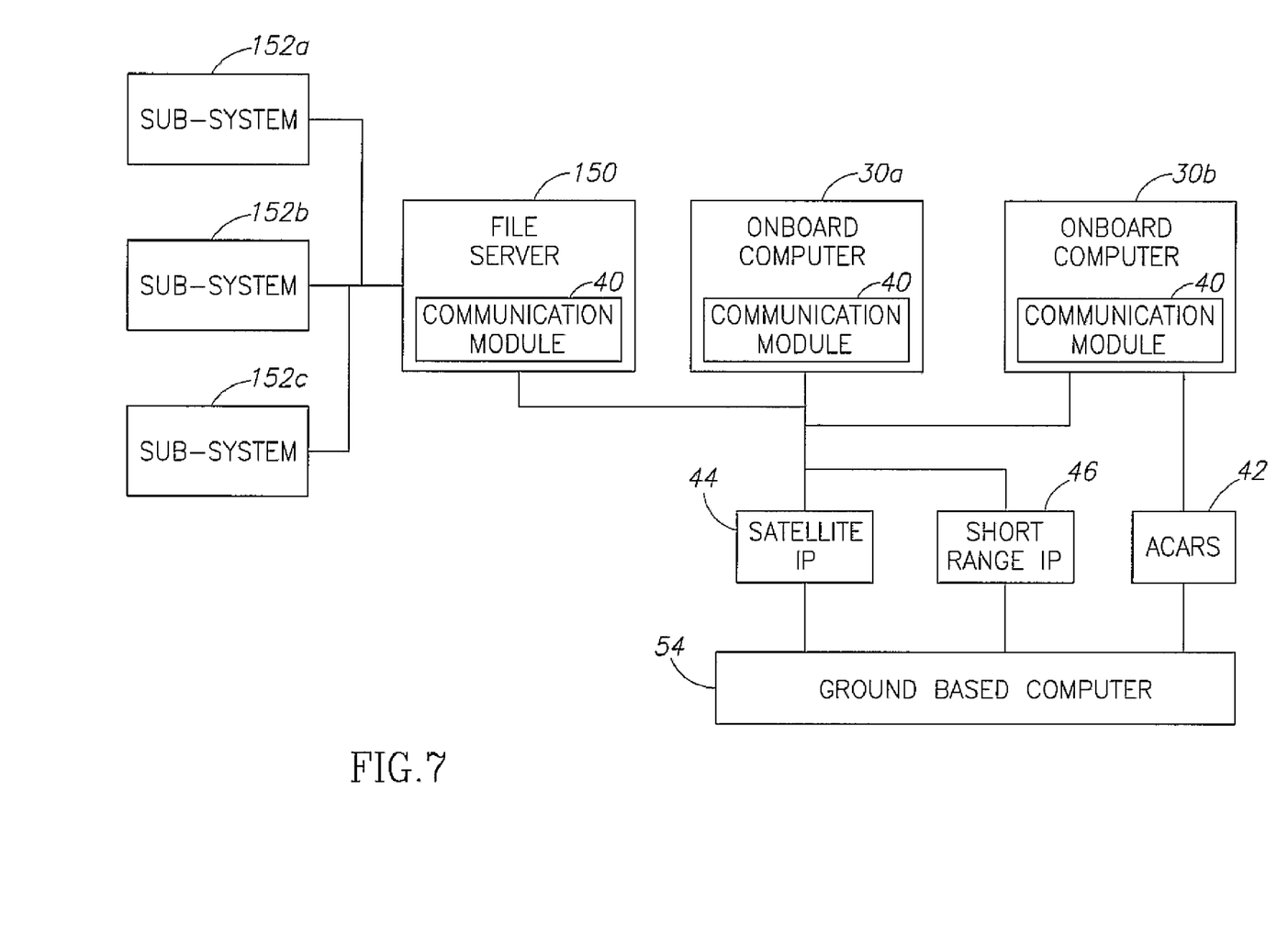
FIG. 7 is a schematic block diagram of an aircraft communication system having an onboard file server, in accordance with an embodiment of the present invention.

Referring to FIG. 7, an aircraft 10 may have a file server 150 such as a network file system (NFS) server. The server 150 is coupled to aircraft subsystems 152a-152c to provide network connectivity therebetween and file storage. In some embodiments, the file server 150 communicates with devices external to the aircraft 10 by means of the satellite IP system 44 and short range IP system 46. The file server 150 may or may not communicate by means of the ACARS system 42. In the illustrated embodiment, the file server 150 is not configured to communicate by means of the ACARS system 42.

The aircraft 10 may have a plurality of onboard computers 30a, 30b one or more of which is capable of communicating with the ACARS system 42. The file server 150 may host a communications module 40 programmed to forward messages from the subsystems 152a-152c to the onboard computer 30b for transmission over the ACARS system 42. The communications module 40 of the file server 150 may be programmed to evaluate a configuration file 48, 64 for the subsystems 152a, 152c to determine whether a message is to be forwarded to the computer 30b. The communications module 40 of the file server 150 may be further programmed to evaluate a configuration file 156 for an application or function executed by a subsystem 152a, 152c. The configuration file 48, 64 may list communication systems 42, 44, 46 in order of preference or map message priorities to a preference or preference list as in other instances of the communications module 40 described above.

In alternative embodiments, one or both of the onboard computers 30a, 30b do not connect to the ACARS system 42 whereas the filer server 150 does. In such embodiments, the communications modules 40 of the onboard computers 30a, 30b behave as the communications module 40 of the filer server 150 described above, such that messages transmitted over the ACARs system 42 are first transmitted to the file server 150, which then forwards the messages over the ACARS system 42.

The communications module 40 of the onboard computer 30b is programmed to receive messages from the file server 150 and transmit the messages on the ACARS system 42. The communications module 40 of the onboard computer 30b is likewise programmed to receive messages from the ACARS system 42 and forward the messages to the file server 150.

Figure 8:
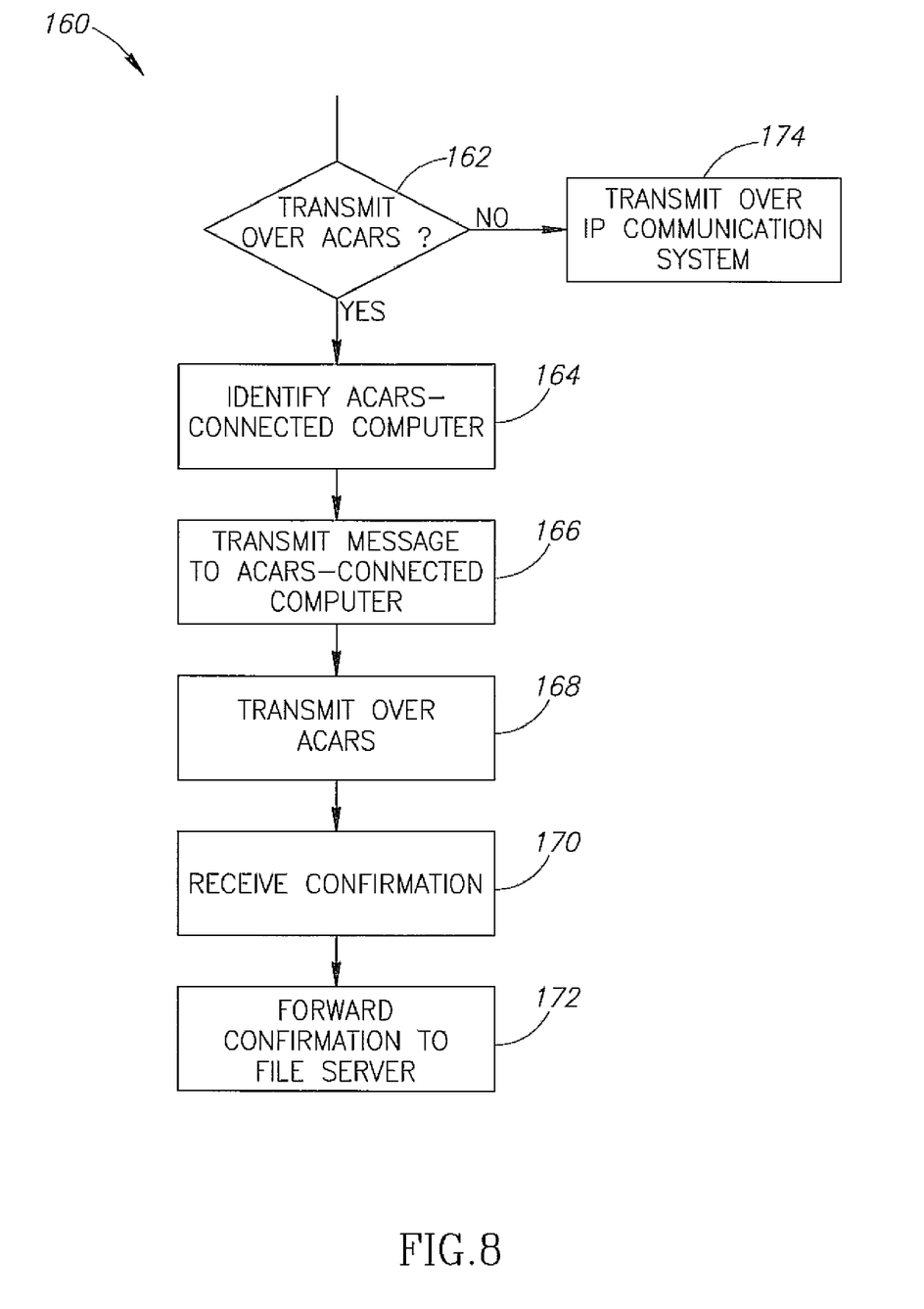
FIG. 8 is a process flow diagram of a method for handling messages from a file server in the aircraft communication system of FIG. 7.

FIG. 8 illustrates a method 160 for handling aircraft communications using the system of FIG. 7. At block 162 the communications module 40 of the file server 150 evaluates whether a message is to be sent over the ACARS system 42. Block 162 may include referencing the configuration file 156 for the NFS, one of the subsystem 152a-152c, or an application executed by one of the subsystems 152a-152c generating the message. At block 164 the communications module 40 determines which onboard computer 30a, 30b is connected to the ACARS system 42. At block 166 the communications module 40 transmits the message from the file server 150 to the onboard computer 30a, 30b selected at block 164. The message is transmitted by the communications module 40 of the onboard computer 30a, 30b over the ACARS system 42 at block 168. Confirmation may be received form the recipient of the message to the onboard computer 30a, 30b at block 170. The onboard computer 30a, 30b may then forward the confirmation to the file server 150 at block 172. Messages not intended to be sent over the ACARS system 42 are transmitted over one of the IP-based communication systems 44, 46 at block 174.

While preferred and alternate embodiments of the invention have been illustrated and described, as noted above, many changes can be made without departing from the spirit and scope of the invention. Accordingly, the scope of the invention is not limited by the detailed description, but rather, the invention should be determined entirely by reference to the claims that follow.

What is claimed is:

1. A method for handling aircraft communications, comprising:

providing a plurality of broadcast networks configured to send and receive data according to a plurality of protocols;

providing a ground-based computer configured to communicate over the plurality of broadcast networks;

providing at least one onboard transmission device configured to communicate over the plurality of broadcast networks and an onboard computer hosting a plurality of applications and a communications module in data communication with the plurality of applications;

generating a message by an application;

transferring the message to the communications module;

evaluating a preference to determine a preferred network of the plurality of transmission networks;

storing the message in one of a plurality of queues each corresponding to one of the broadcast networks;

monitoring the availability of the broadcast networks;

re-evaluating the preferences of the message according to changes in availability of the broadcast networks to determine a current preferred network corresponding to a highest in preference of the plurality of broadcast networks in the preference lists corresponding to the message; and moving the message to the queue of the plurality of queues corresponding to the current preferred network of the message;

preparing the message for transmittal according to the protocol of the preferred network; and transmitting the message over the preferred network.

2. The method of claim 1, wherein the message has a priority associated therewith, the method further comprising storing the message if the preferred network is unavailable and the priority is below a threshold.

3. The method of claim 2, wherein the preferred network is a first preferred network, the method further comprising evaluating the preference to determine a second preferred network of the plurality of broadcast networks and transmitting the message over the second preferred transmission network if the first preferred network is unavailable and the priority is above the threshold.

4. The method of claim 2, further comprising transmitting the message when the preferred network becomes available.

5. The method of claim 2, wherein the preference comprises a preference list identifying a selection of the plurality of broadcast networks in order of preference.

6. The method of claim 5, wherein evaluating a preference to determine a preferred network comprises identifying the highest in preference of the plurality of broadcast networks in the preference list that is available.

7. The method of claim 1, further comprising storing the message if the preferred network is unavailable and transmitting the message when the preferred network becomes available.

8. A communications module, comprising:
a first portion adapted to receive a message from an application installed on an onboard computer of an aircraft;
a second portion adapted to evaluate a preference to determine a preferred network of a plurality of transmission networks configured to send and receive data according to a plurality of protocols; and
a third portion adapted to prepare the message for transmittal according to the protocol of the preferred network; and
a fourth portion adapted to transmit the message over the preferred network.

9. The communications module of claim 8, further comprising a fourth component adapted to store the message if the preferred network is unavailable and a priority associated with the message is below a threshold.

10. The communications module of claim 9, wherein the preferred network is a first preferred network the second portion further adapted to evaluate the preference to determine a second preferred network of the plurality of broadcast networks and the fourth portion further adapted to transmit the message over the second preferred transmission network if the first preferred network is unavailable and the priority is above the threshold.

11. The communications module of claim 9, wherein the fourth portion is further adapted to transmit the message when the preferred network becomes available.

12. The communications module of claim 9, wherein the preference comprises a preference list identifying a selection of the plurality of broadcast networks in order of preference.

13. The communications module of claim 12, wherein the second portion is further configured to identify the highest in preference of the plurality of broadcast networks in the preference list that is available.

14. The communications module of claim 8, comprising a fifth portion adapted to store the message if the preferred network is unavailable and transmit the message when the preferred network becomes available.

15. The communications module of claim 8, wherein one of the transmissions networks is an ACARS network.

16. A system for handling aircraft communications, comprising:
a plurality of broadcast networks configured to send and receive data according to a plurality of protocols;
a ground-based computer configured to communicate over the plurality of broadcast networks;
an aircraft comprising at least one onboard transmission device configured to communicate over the plurality of broadcast networks and an onboard computer hosting a plurality of applications and a communications module in data communication with the plurality of applications, the communications module configured to receive a message generated by the plurality of applications, to evaluate a preference to determine a preferred network of the plurality of transmission networks, to prepare the message for transmittal according to the protocol of the preferred network, and to transmit the message over the preferred network.

17. The system of claim 16, wherein the message has a priority associated therewith, the communications module further configured to store the message if the preferred network is unavailable and the priority is below a threshold.

18. The system of claim 17, wherein the preferred network is a first preferred network, the communications module further configured to evaluate the preference to determine a second preferred network of the plurality of broadcast networks and transmit the message over the second preferred transmission network if the first preferred network is unavailable and the priority is above the threshold.

19. The system of claim 17, wherein the communications module is further configured to transmit the message when the preferred network becomes available.

20. The system of claim 17, wherein the preference comprises a preference list identifying a selection of the plurality of broadcast networks in order of preference.

21. The system of claim 20, wherein the communications module is configured to determine the preferred network by identifying the highest in preference of the plurality of broadcast networks in the preference list that is available.

22. The system of claim 21, wherein the communications module is further configured to store the message if the preferred network is unavailable and transmit the message when the preferred network becomes available.

23. The system of claim 17, wherein the communications module is further configured to store the message if the preferred network is unavailable and transmit the message when the preferred network becomes available.

* * * * *